United States Patent [19]
Kreuter et al.

[11] Patent Number: 5,875,221
[45] Date of Patent: Feb. 23, 1999

[54] METHOD AND DEVICE FOR OPERATING A REACTOR IN AN UNSTABLE STATE

[75] Inventors: Dieter Kreuter, Roedermark; Godehard Rauch, Rodgau; Joachim Schulze, Frankfurt, all of Germany

[73] Assignee: Siemens Aktiengesellschaft, Munich, Germany

[21] Appl. No.: 890,258

[22] Filed: Jul. 9, 1997

Related U.S. Application Data

[63] Continuation of PCT/DE96/00014, Jan. 8, 1996.

[30] Foreign Application Priority Data

Jan. 9, 1995 [DE] Germany ......................... 195 00 395.0

[51] Int. Cl.$^6$ ....................................................... G21D 3/08
[52] U.S. Cl. ............................................ 376/215; 376/254
[58] Field of Search .................................... 376/215, 216, 376/254, 255, 259

[56] References Cited

U.S. PATENT DOCUMENTS

| | | | |
|---|---|---|---|
| 5,174,946 | 12/1992 | Watford et al. | 376/216 |
| 5,225,149 | 7/1993 | Banda | 376/259 |
| 5,406,598 | 4/1995 | Takeuchi et al. | 376/254 |

FOREIGN PATENT DOCUMENTS

| | | |
|---|---|---|
| 0496551A1 | 7/1992 | European Pat. Off. . |
| 0520712A1 | 12/1992 | European Pat. Off. . |
| 93/07623 | 4/1993 | WIPO . |

OTHER PUBLICATIONS

Japanese Patent Abstract No. 6/094882 (Tomoaki), dated Apr. 8, 1994.
Japanese Patent Abstract No. 62/075295 (Jigyo), dated Apr. 7, 1987.
Japanese Patent Abstract No. 60/159691, dated Aug. 21, 1985.
Japanese Patent Abstract No. 59/196499, dated Nov. 7, 1984.

*Primary Examiner*—Daniel D. Wasil
*Attorney, Agent, or Firm*—Herbert L. Lerner; Laurence A. Greenbrg

[57] ABSTRACT

A transiently unstable state of a boiling-water reactor is damped by measuring the oscillating neutron flux and, after a first threshold value is exceeded over a plurality of oscillation periods, the rate of increase of the oscillation is determined. Depending on the slope of the increase, and after a further threshold value (in particular one dependent on the rate of increase) for the oscillating flux is exceeded, a selection is made which one of various stabilization strategies for damping the oscillation should be triggered before a SCRAM becomes necessary. A hierarchy of stabilization strategies is available: blocking a power increase, for instance, in the control system, controlled slow reduction of the power, or rapid power reduction by a "partial SCRAM". The monitoring of the unstable state is effected with a system of sensors strategically distributed throughout the core and which redundantly measure the flux in one region of the core. The sensors act on a plurality of redundantly operating systems, and the signal from each sensor is effective in only one of the redundant systems.

2 Claims, 9 Drawing Sheets

METHOD AND DEVICE FOR OPERATING A REACTOR IN AN UNSTABLE STATE

CROSS-REFERENCE TO RELATED APPLICATION

This application is a continuation of copending international application PCT/DE96/00014, filed Jan. 8, 1996.

BACKGROUND OF THE INVENTION

Field of the Invention

The invention relates to a method of operating a boiling-water reactor which is an unstable state as a result of local oscillation of a physical variable (in particular of the power or of the neutron flux associated therewith). In addition, the invention relates to a device for carrying out this method and to a method and a device for monitoring the unstable reactor state.

The nuclear fission determining the power of a nuclear reactor is controlled by moving absorber elements into the reactor core in order to attenuate the neutron flux. In this arrangement, measuring lances having sensors for the flux of thermal neutrons are distributed over the reactor core, in order to register the current state. In order to adjust a desired operating state, it is also necessary for the throughput of coolant (cooling water), which serves at the same time as a moderator, to be adapted to the respective state.

The coolant enters in liquid phase into the reactor core from below, flows through the fuel elements, in which it partially evaporates, and emerges from the core as a vapor phase/liquid phase mixture, as a result of which the fuel/moderator ratio in the various parts of the fuel elements is changed. At the same time, however, the flow conditions are changed, in particular the location at which the single-phase flow, with which the liquid coolant enters the fuel elements, changes into the two-phase flow of the liquid/vapor mixture. In this case, at high power and low coolant throughput, unstable conditions have been observed in which this phase boundary goes into an oscillating motion, which results in a pulsation of the moderator density and the power, which has a bearing on the cooling capacity and the movement of the phase boundary. In this case, periodic temperature fluctuations with considerable peak values may occur in the fuel elements.

The permissible power maximum of the fuel elements is mainly limited by the temperature resistance of the materials used in the fuel elements. If an upper temperature limit is exceeded, the materials loose their mechanical, chemical and physical properties and can undergo irreversible changes, which can force an exchange of the fuel elements. Therefore, care must be taken that this thermal-hydraulic upper power threshold (and hence a thermal-hydraulic threshold value $A_{th}$ of the neutron flux) in the reactor is not exceeded. Safety provisions in the reactor operation therefore call for a rapid shutdown of the reactor (so-called "SCRAM"), in the event the threshold value is exceeded. In such an emergency program, all the control rods are rapidly moved in and the corresponding cooling capacity is set.

Following such a SCRAM, the reactor is restarted according to a predetermined startup program, so that there is a considerable disturbance to the reactor operation. In addition, the fuel elements have to be changed for safety reasons, if the thermal-hydraulic threshold value has been reached many times or over a relatively long period of time.

The art is therefore concerned with detecting and damping an unstable state of this type as early as possible, before the power pulsations reach the vicinity of the thermal-hydraulic threshold value.

It has been shown that these pulsations always occur in a frequency range between about 0.3 and 0.7 Hz and have a very constant frequency. The method described in U.S. Pat. No. 5,174,946 to Watford et al. (=EP 0 496 551) for monitoring the power fluctuation band for nuclear reactors is based on that fact.

That process utilizes the flux as a measured variable for the unstable state caused by the local oscillation of a physical variable, the measuring lances mentioned ("local power range monitor-strings", LPRM strings) being used for this flux measurement. Each such lance normally contains four sensors, whose signals are observed anyway for power control purposes, then further processed and documented.

Each of these four sensors in each measuring lance is used, two sensors being assigned to a first monitoring system, the two remaining sensors being assigned to a redundant second monitoring system. Each monitoring system thereby contains two monitoring channels, each sensor signal of a measuring lance being assigned to a different monitoring channel. Different subdivisions of the reactor into individual regions ("monitoring cells") are in this case based on the two monitoring channels of a system, each cell being bounded by four measuring lances in order to form a corresponding region signal. Depending on the location of the measuring lance in the core (in the interior of the core or at the edge of the core), a sensor signal in each monitoring channel belongs to two, three or four cells. As a result of this multiple use of the sensor signals, it is intended to achieve the situation where virtually the state of each individual fuel element can be monitored and identified by means of the influence which it has on the sensor signals of the individual cells. To this end, provision is made that an alarm is set in a system only when both monitoring channels respond. Although it is sufficient for the alarm to be given by one of the two systems, only simple redundancy is provided thereby.

A further disadvantage is that virtually all the monitoring channels are affected by an erroneous measurement or a complete failure of a measuring lance, it being possible in the case of an edge position of the measuring lance, for example, that simultaneously a plurality of cells are no longer being monitored properly.

The state of the individual cells (regions) is monitored by initially monitoring in a plausibility control whether the individual sensor signal exceeds a specific lower threshold value and is operating properly. In the case of a sensor defect, the signals belonging to this cell are not evaluated further. By means of summing all the sensor signals of a region, a current region signal is formed which is suppressed, however, if (for example as a result of an erroneous measurement) a plausibility monitoring yields the fact that the region signal does not achieve a predefined minimum value. The region signal is then filtered and related to an average over time, the time constant of which is greater than a period of the oscillation, so that a relative current region signal is produced which indicates by how many percent the current power of the region lies above or below the average.

If this current value exceeds a power limit (for example 120%), a check is then made as to whether this is a once-off transition state (so-called "transient") which for example constitutes only an aperiodic transition to a new operating state predefined by the control, without exciting an oscillation. In this case, this is not therefore a critical oscillation in the frequency band from 0.3 to 0.7 Hz, so that no intervention is carried out as long as a threshold value $A_{max}$, lying in the vicinity of the thermal-hydraulic threshold value $A_{th}$, is not reached.

In order to detect the critical oscillation, instead an examination is made to see whether, in a time interval corresponding to this critical frequency band, the value does not also fall below a corresponding threshold value (e.g. 80%) following the exceeding of a limiting value $A_o$ as is necessary for an oscillation. If it is determined in this way that—corresponding to an oscillation—a lower extreme value follows an upper extreme value of the flux, a check is further made as to whether another upper extreme value follows this lower extreme value, and whether this following upper extreme value exceeds an alarm value which lies above the extreme value detected first by a predefined factor (e.g. 1.3). If this is so, then after this one oscillation period it is already concluded that there is a growing, i.e., increasing oscillation, in which the exceeding of $A_{th}$ is threatened, and the SCRAM is initiated even before the value $A_{max}$ is reached.

With an eye to the present invention, reference is made at this point that, although the above-described prior art monitors whether the oscillation is growing at a rate lying above the predefined factor (here 1.3), the growth (rate of increase) of the extreme values is not itself measured. This factor (1.3) is also relative in as much as it is related to the extreme value detected first, but it independent of the rate of increase.

In addition, reference is made to the fact that although it is checked whether the time interval between the detected extreme values corresponds to the critical frequency band of 0.3 and 0.7 Hz, no check is made as to whether the next extreme value $A_{n+1}$ follows in practice at the same interval $DT_n$, which is given by the previously detected upper extreme value (denoted $A_{n-1}$, point in time $T_{n-1}$) and the presently detected lower extreme value ($A_n$, point in time $T_n$), after this point in time $T_n$. Those skilled in the art of reactor control and monitoring will appreciate that the usual techniques for the monitoring and documentation of the sensor signals apply and they will therefore readily be able not only to register the extreme values $A_{n-1}, A_n, A_{n+1} \ldots$ but also the points in time $T_{n-1}, T_n, T_{n+1} \ldots$ at which these extreme values occur. The person in charge of monitoring could therefore readily suppress the corresponding region signal if the time interval $DT_n = T_n - T_{n-1}$ deviates significantly (for example 0.1 seconds) from the time interval $DT_{n+1} = T_{n+1} - T_n$. However, U.S. Pat. No. 5,174,946 contains no advice on this point.

In the state of that prior art, therefore, no attention is initially paid to an oscillation whose (unmeasured) rate of increase lies below the set factor (1.3); rather, intervention is considered in the reactor operation only when its extreme values exceed the threshold value $A_{max}$. Only rapidly increasing oscillations cause this extremely critical state to be recognized in good time and to the initiation of suitable countermeasures. Apparently, it is assumed that slowly increasing oscillations inherently decay by themselves and normally do not require a SCRAM.

To be specific, that prior art provides as counter-measure only to damp the oscillation by means of rapidly moving in virtually all the control rods (total SCRAM). That is to say, apart from the SCRAM, this strategy provides no further measure for damping the oscillation and does not reduce the probability of the SCRAM either, which constitutes a considerable intervention in the reactor operation. Instead, in the event that there is a rapidly increasing oscillation, damping only takes place earlier (i.e., below $A_{max}$). As a result, only the thermal loading of the fuel elements is reduced.

SUMMARY OF THE INVENTION

It is accordingly an object of the invention to provide a method and device for operating a reactor in an unstable state, which overcomes the above-mentioned disadvantages of the heretofore-known devices and methods of this general type and which improves the oscillation detection and damping so as to entirely obviate any SCRAM, i.e., to manage without an intervention in the reactor operation, or with an intervention which is the least disturbing. It is a further object to allow the monitoring of the critical state with a system and method which is least susceptible to interference.

With the foregoing and other objects in view there is provided, in accordance with the invention, in a reactor operated in accordance with operationally dependent input parameters, a method of operating the reactor which is unstable as a result of an oscillation of an internal physical variable, which comprises:

measuring the physical variable during at least two oscillations and calculating at least one measured value for a rate of increase of the oscillation; and deciding, in dependence on the measured value, whether a stabilization strategy is to be initiated with changed input parameters for damping the instability or a reactor operation is to be continued with unchanged input parameters.

By measuring the physical variable (i.e., the neutron flux, in the case of the thermally-hydraulically induced oscillations) the invention provides for the formation of local measured values in a plurality of regions of the reactor core, the measured values being assigned to the respective regions. The monitoring of the measured values leads to the formation of a current alarm stage from among a hierarchy of alarm stages with associated monitoring criteria, and the selection of the highest alarm stage, whose monitoring criterion is satisfied by the measured values in a predefined minimum number of the regions. (The monitoring criterion can in this case be composed of a plurality of individual conditions, for example the exceeding of separate threshold values for the amplitude and for the rate of increase of the extreme values.) Depending on the current alarm stage, a stabilization strategy is then initiated. As a stabilization strategy which belongs to a low-ranking alarm stage, provision is made to intervene in the operational control and regulation of the reactor only so as to block a removal of the control rods, as is envisaged in the case of an operational increasing of the reactor power: the power of the reactor cannot then be raised by the operating personnel of the reactor; instead only such control commands which correspond to the control of the reactor to a constant or decreasing power become effective in the reactor control system. In at least one higher-ranking alarm stage, provision is made as stabilization strategy for a plurality of control rods to be introduced into the core in the sense of a reduction in the reactor power (alarm stage I). Advantageously, at least two higher-ranking alarm stages (alarm stage II and alarm stage III) are provided, in alarm stage II only a plurality of control rods, corresponding to a fraction of the total number, being moved into the core slowly and in such a way as corresponds to an operational reduction in the power (that is to say the reactor control system performs an operational reduction in the power, even if, for example, a higher power consumption would intrinsically require a higher reactor power and the operating personnel wish to increase the reactor power). In the second higher-ranking alarm stage (alarm stage III)—in a manner similar to the case of a total rapid shutdown of the reactor (total SCRAM)—control rods are moved in rapidly, however likewise not all thereof but only some of the control rods being involved ("partial SCRAM"). A total SCRAM is then no longer necessary, but an option for an alarm stage IV which triggers the SCRAM can be retained.

In particular, during the monitoring of the measured values, at least two periods of the oscillation are evaluated, so that the reactor is therefore initially further operated in an unchanged manner, although an oscillation is already indicated.

Furthermore, a method of operating a reactor which is unstable as a result of oscillation of a physical variable occurring in the core makes provision, by measuring the physical variable, for forming a measured value which registers the rate of increase of the oscillation (if appropriate, also further measured values). Depending on this measured value, a decision is made as to whether a stabilization strategy should be initiated in order to damp the instability or the reactor is initially further operated in accordance with measured values entered as a function of operation. In particular, in this case the reactor can continue to be operated for at least two more oscillations during the measurement of the rate of increase, without an intervention being made in the reactor control system—provided that no measured value reaches a threshold value which calls for the initiation of a total SCRAM. Thus, for example, it is possible that when a threshold value $A_{max}$ for the oscillation amplitudes is exceeded, the SCRAM—corresponding to the highest alarm stage IV—is initiated only at high rates of increase, but at low rates of increase the reactor is still operated with relatively high amplitudes, since in the case of amplitudes which are growing so weakly, a SCRAM which is initiated only later (in the event that the oscillation then does not intrinsically decay) still has sufficient time to become effective before $A_{th}$ is reached.

A threshold value, dependent on the rate of increase, is preferably predefined for the extreme values of the oscillating physical variable, and the stabilization strategy is triggered if the extreme values exceed this threshold value. However, a threshold value for the rate of increase can also be predefined, the stabilization strategy then being initiated when the rate of increase exceeds this threshold value. In a similar embodiment of the invention, a number of oscillations can be predefined, the number depending on the rate of increase, and the stabilization strategy can then be triggered only when the oscillation of the physical variable persists over the duration of these oscillation periods.

In accordance with an added feature of the invention, a plurality of stabilization strategies are provided, from which the stabilization strategy to be triggered is selected as a function of the rate of increase.

The (unstable) state of the reactor core is monitored with a plurality of sensors which are strategically distributed about the core. The sensor locations are divided into a plurality of regions of the reactor core and the sensors measure the behavior of the physical variable in those regions. The output signals of the sensors are combined into a number Mp of region channels and each region channel is assigned a region and sensors arranged therein for generating a region signal. The region signals are then combined into a number P of system channels, with a plurality of region channels being assigned to a system channel, in that they generate a system signal. The system signals are finally assigned to an output channel and they generate an output signal. By means of monitoring stages and selection stages, in this case an alarm output signal is set in the output signal as soon as, at least in a predefined number $N_p$ of the system channels, particularly in a minimum number $N_{mp}$ of region channels of the system, a monitoring criterion is satisfied over a plurality of oscillation periods. In this case, the output signal of each sensor influences a maximum of one single region signal and each region signal influences a maximum of one system signal. The region signals of a system channel are in each case formed from the output signals of sensors which are located in regions which are distributed over the cross section of the reactor core in such a way that the regions which are adjacent to such a region contain sensors whose output signals are assigned to region channels of other system channels.

The invention thus effectively dispenses with multiple evaluations and region overlaps. Although each individual fuel element is no longer as precisely monitored as in the Watford et al. patent, experience and model calculations with unstable states have shown that it is always relatively large parts of the reactor, but not isolated fuel elements, which begin oscillating. In other words, fine resolution of the measured value registration is not necessary. In addition, the redundancy and interference immunity of the registration is increased.

With the above and other objects in view, there is further provided, in accordance with the invention, a device for monitoring a reactor core of a boiling-water reactor with regard to local oscillations of a physical variable causing an unstable state of the reactor. The device comprises:

a system selection stage, a plurality of region selection stages connected to the system selection stage, a given number of region monitoring stages connected to each the region selection stage, and a sensor stage connected to each the region monitoring stage with a plurality of sensors strategically disposed in regions of a reactor core of a boiling water reactor, wherein a) measured signals supplied by the sensors to a respective the region monitoring stage are combined into a region signal for the physical variable; each the region signal is monitored in the respective the region monitoring stage in accordance with a monitoring criterion, and a region signal containing a region monitoring signal is output by each region monitoring stage;

b) each region signal is connected to at least one of the region selection stages, and the region selection stages forming respective system monitoring signals from a predefined minimum number of region monitoring signals; and c) the region selections stages each outputting a respective system monitoring signal to the system selection stage, and the system selection stage outputting an output monitoring signal according to a predefined minimum number of systems.

There is further provided, in accordance with the invention, a device for monitoring a reactor core of a boiling-water reactor with regard to a state which is unstable as a result of local oscillation of a physical variable in the reactor core, comprising:

a) a plurality of sensors disposed in a plurality of regions of a reactor core of a boiling-water reactor, the sensors measuring a physical variable of the reactor core and outputting output signals, the output signals of a plurality of the sensors of a given region being combined into an associated region signal;

b) a plurality of evaluation stages each receiving a respective region signal, the evaluation stages identifying in the region signal an occurrence of extreme values of the physical variable and, given an oscillation of constant frequency, determining a rate of increase of the extreme values in the respective region; and c) at least one monitoring stage receiving output signals from the evaluation stages, the monitoring stage setting an alarm signal when the extreme values of a predefined number of regions satisfy a local monitoring criterion which depends on the rate of increase of the extreme values In other words, there is provided a system selection stage, a number P of region selection stages, for each region selection stage a number Mp of region monitoring stages and for each region monitoring stage a sensor stage having a plurality of sensors which are arranged inside a region of the core and are assigned to this region monitoring stage. The device is constructed in such a way that the sensors which are respectively assigned to a region monitoring stage supply measured signals for the physical variable which are combined into a region signal, and each region signal is monitored in accordance with a monitoring criterion in the region monitoring stage assigned to the sensors. Each region monitoring stage supplies a region signal which contains a region monitoring signal. Each region monitoring signal is connected to at least one region selection stage which forms a system monitoring signal from a predefined minimum number of region monitoring signals. Each system monitoring signal is then fed to the system selection stage; the latter supplies an output monitoring signal by means of a predefined minimum number of system monitoring stages.

The system sensors which are strategically distributed about a plurality of regions of the reactor core for measuring the physical variable. The output signals of a plurality of sensors of a region are combined into an associated region signal. Each region signal is assigned an evaluation stage, which identifies in the region signal the occurrence of extreme values of the physical variable (in particular over a plurality of oscillation periods) and, given an oscillation of constant frequency and appropriate duration, determines the rate of increase of the extreme values in this region. The evaluation stages are assigned at least one monitoring stage which sets an alarm signal as soon as the extreme values at least in a predefined number of regions satisfy a local monitoring criterion which depends on the determined rate of increase.

With a view to the proposed stabilization criteria, a device for monitoring the local oscillations can contain sensors for measuring the physical variable, which sensors are arranged in a plurality of regions of the reactor core, and the output signals of a plurality of sensors of a region being combined into an associated region signal. Each region signal is then assigned an evaluation stage which identifies the occurrence of an oscillation of constant frequency in the region signal. The evaluation stages are assigned an output monitoring stage which selects an alarm stage from a hierarchy of alarm stages in accordance with predefined monitoring criteria for the oscillations identified in at least a predefined number of region signals. In this case, the output monitoring stage, corresponding to the selected alarm stage, defines a point in time (or at least the criteria for the point in time) at which an emergency instruction is output to initiate a stabilization strategy corresponding to the alarm stage. This point in time can be predefined, for example, by means of a number of oscillation periods which are allowed to elapse before the initiation of a stabilization measure. However, by this means it can also be defined that, depending on the instantaneous current values (for example current values of the rate of increase) a threshold value (for example a threshold value for the amplitude) is defined, which leads to the triggering of the stabilization measure at a later point in time, at which a monitored current value (e.g., the amplitude) then exceeds this predetermined threshold value.

Other features which are considered as characteristic for the invention are set forth in the appended claims.

Although the invention is illustrated and described herein as embodied in a method and device for operating a reactor in an unstable state, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
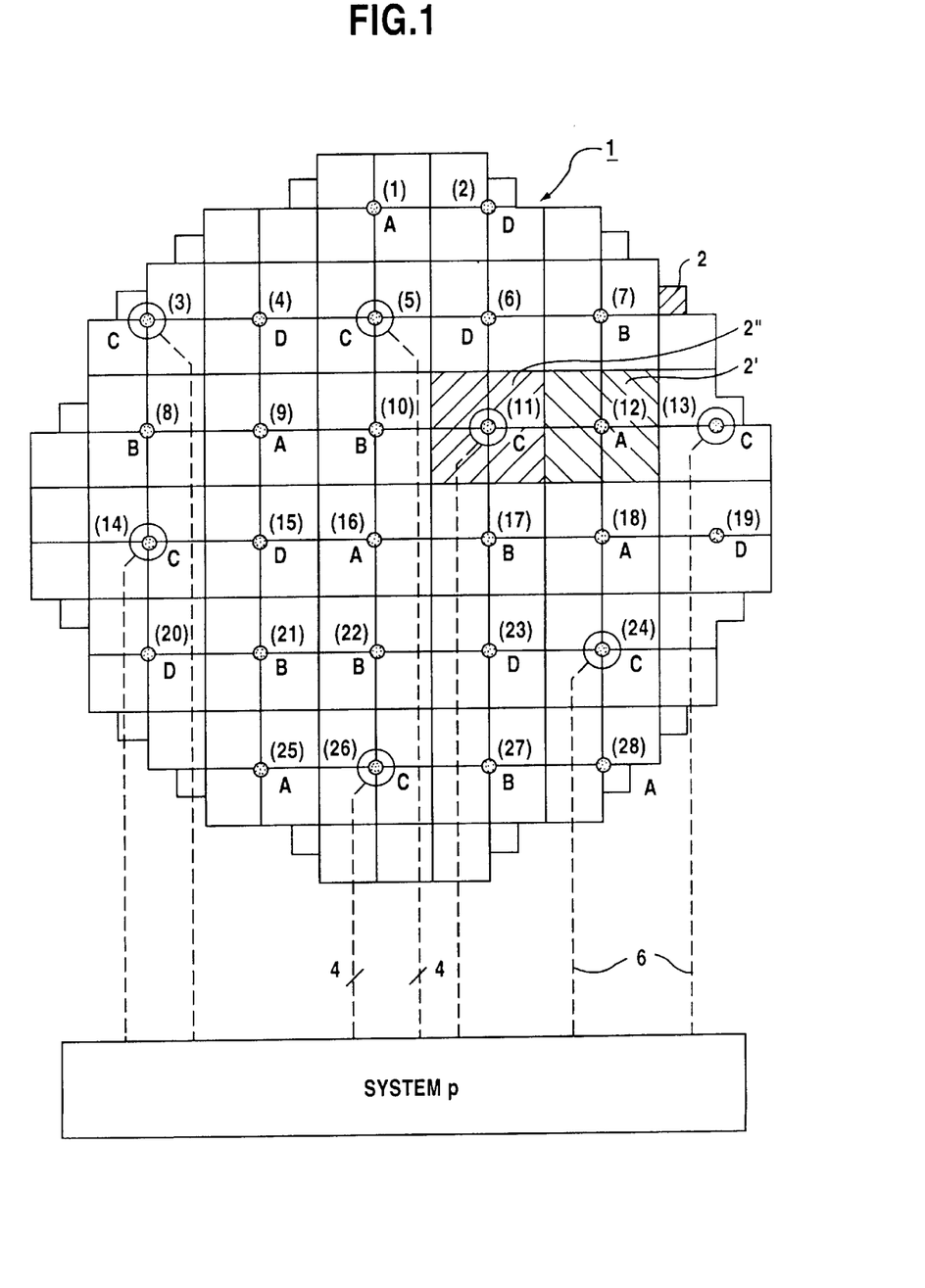
FIG. 1 is a schematic plan view of the fuel elements and measuring lances in the core of a boiling-water reactor, and their assignment to monitoring regions and monitoring systems.

Referring now to the figures of the drawing in detail and first, particularly, to FIG. 1 thereof, there is seen a cross section 1 through a reactor core, in which square fuel elements 2 stand closely adjacent to one another in the manner of a checkerboard. With the exception of the edge regions, four such fuel elements each form a square, in which a respective measuring lance designated by (1), (2) . . . (28) is arranged only at one corner. A measuring lance of this type is therefore generally arranged at the common corner of four mutually abutting squares made up of four fuel elements each. For the evaluation of the signals of these measuring lances, once more with the exception of edge regions, four such squares are combined into a "region" (for example the adjacent, differently hatched regions 2', 2"), which thus register virtually the entire region of the core in the manner of a checkerboard. Since each measuring lance (reference numeral 3 in FIG. 2) comprises four sensors 4a, 4b, 4c and 4d arranged one above another in a sleeve pipe 5, four sensor signals are supplied to the entire device for monitoring the core via the corresponding measuring lines 6 of the measuring lances (1) . . . (28). Each of these measuring lines 6 thus carries the sensor signals assigned to one region.

In FIG. 1, the individual measuring lances, respectively assigned to a region, are designated by one of the letters A, B, C and D, these letters specifying the assignment of the corresponding measuring lances and their sensor signals to a system of a total of p monitoring systems (here p=4). These monitoring systems operate redundantly and in each case supply their own monitoring signal and, if appropriate, alarm signal. These signals are only processed into an endstage monitoring signal or endstage output alarm signal in a system selection.

The corresponding monitor monitoring the core therefore contains only systems which are respectively independent of one another (no sensor signal is processed in more than one system), and the regions monitored by the systems do not overlap. In the event of a failure of a measuring lance, although an entire region of 16 fuel elements is no longer monitored, only one of the redundantly operating systems is influenced thereby, while the other systems are not affected by the failure. Sensors of adjacent region are in this case also always assigned to different systems. These principles are also maintained in the case of other configurations of the core (for example larger cores) and of the measuring lances (for example 34 instead of 28 measuring lances).

In the present case, the 28 measuring lances are distributed among systems having seven regions each (in general an arbitrary region will be designated by m and the total number of regions of a system p by $M_p$. In the example, therefore, $M_p=7$ applies to all the systems). In this assignment all the regions respectively register an identical number (namely four) of sensor signals, whereas in the general case for the individual regions, the number of sensor signals can also be different. This can primarily be provided if the above-mentioned "linear" assignment, in which each sensor is assigned to a maximum of one single system, is not performed.

Each sensor signal is initially subjected to a plausibility control by means of a selection stage 8 in its region channel, firstly those sensor signals being separated out which lie outside the proper operating range of the sensors, as is also provided in the above-mentioned patent to Watford et al. From the remaining output signals from properly operating sensors, however, differing from this prior art, only a minimum number (here: two) is selected, to be specific generally the signals of the lowest sensors which are available. In general, the signals from sensors which are arranged linearly one above another specifically differ only little and, in particular, they show the same time profiles, virtually without a phase shift, which can be traced back to the local power pulsation in this region. The sensors are therefore in principle able to substitute for one another. Taking into account the lowest sensors (4a and 4b in FIG. 2), however, offers a slight advantage, since in the critical region of high power and low coolant throughput, the flux in the lower regions of the fuel elements executes more pronounced oscillations than in the upper regions. In other words, the corresponding extreme values (amplitudes) of the oscillation can be registered more distinctly.

Figure 2:
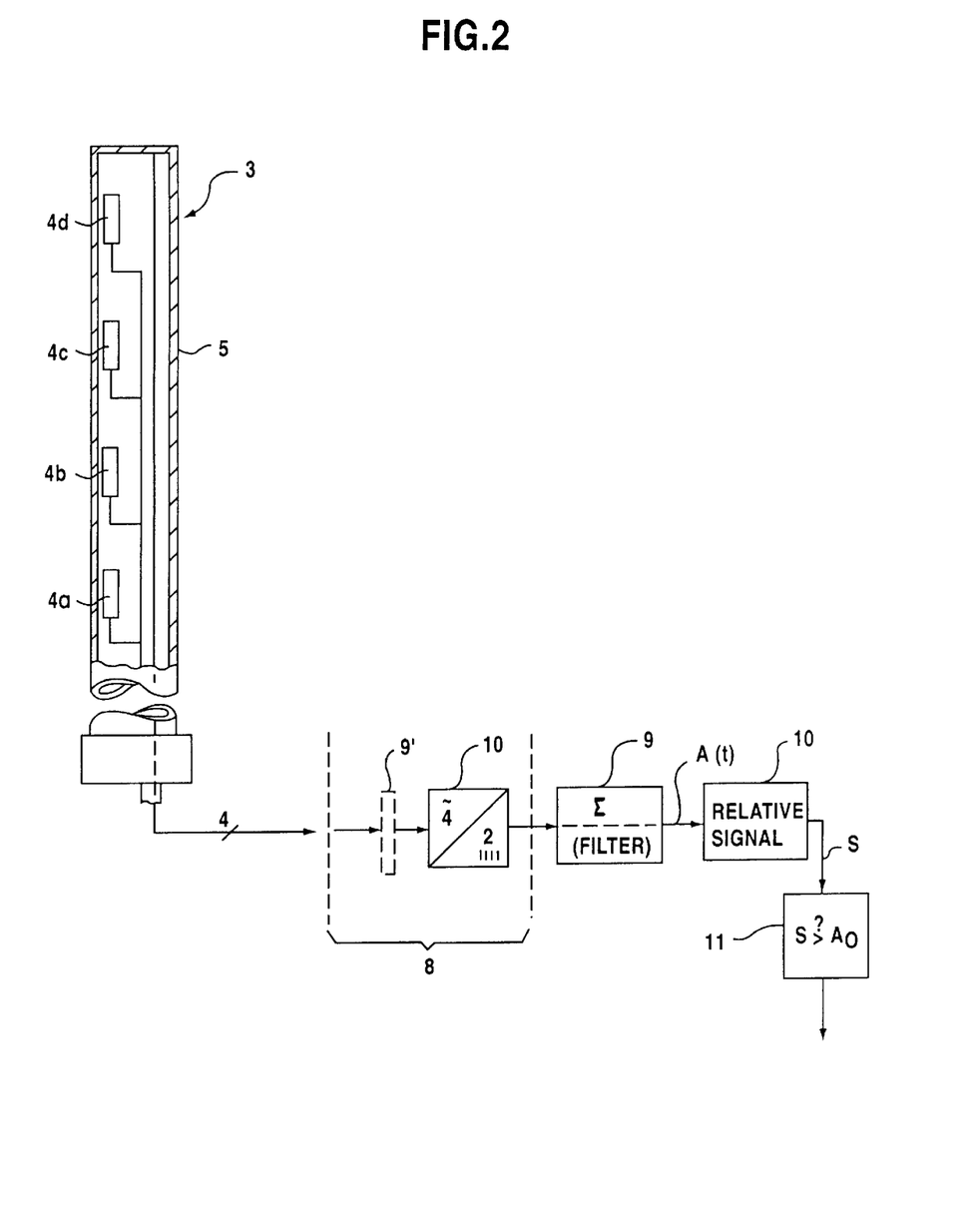
FIG. 2 is a side view of a measuring lance with four sensors for monitoring a region, and a diagrammatic sensor stage assigned to the sensors in a region channel assigned to the particular region.

In particular, an analog filter 9' for the sensor signals can be connected upstream of the selection stage 8 which receives the sensor signals, whereby the sensor signals are subjected to a "2 out of 4" selection on processing in the component 10, which may simultaneously undertake a conversion of the analog input signals into digital output signals, so that instead of the analog filter 9' connected upstream, a digital filter 9 can also be connected downstream (in signal flow direction). In addition, in the case of this filter 9 a summation of the two output signals of the evaluation stage 8 is also performed, in order to obtain an instantaneous value for the flux into the appropriate region which is averaged over the model variation of the individual sensors. This corresponds to the summation of the sensor signals in the individual "cells" of the above-mentioned patent to Watford et al. However in the case of the prior art, the corresponding "cell signal" is formed from sensor signals which are also used in the monitoring of other regions and in other systems.

Finally, in a standardization unit, a current measured value $A(t)-A^*$ is formed at the output of the filter 9 from the current signal $A(t)$. The measured value can be standardized, for example, to the average signal level $A^*$ of this region. As described in the prior art, the average level can be formed by an integrator 10 in that the signal $A(t)$ measured over a relatively long integration time period is integrated. This standardization supplies an alternatingly positive and negative measured value, so that the oscillation amplitudes lie symmetrically about a zero point and can be registered easily. However, digital signal processing makes it possible, also without great outlay, to register the amplitude of a half-period in each case, even in the case of otherwise standardized or unstandardized signals S. In that case, it may then be advantageous for the threshold values to be predefined as absolute values instead of relative values.

Finally, the further processing of the signal S is suppressed as long as it lies under a threshold value $A_o$ for the normal signal noise, and therefore a determination of extreme values ("peaks" or "amplitudes"), which could be assigned to an oscillation, is not possible (threshold value element 11).

Figure 3:
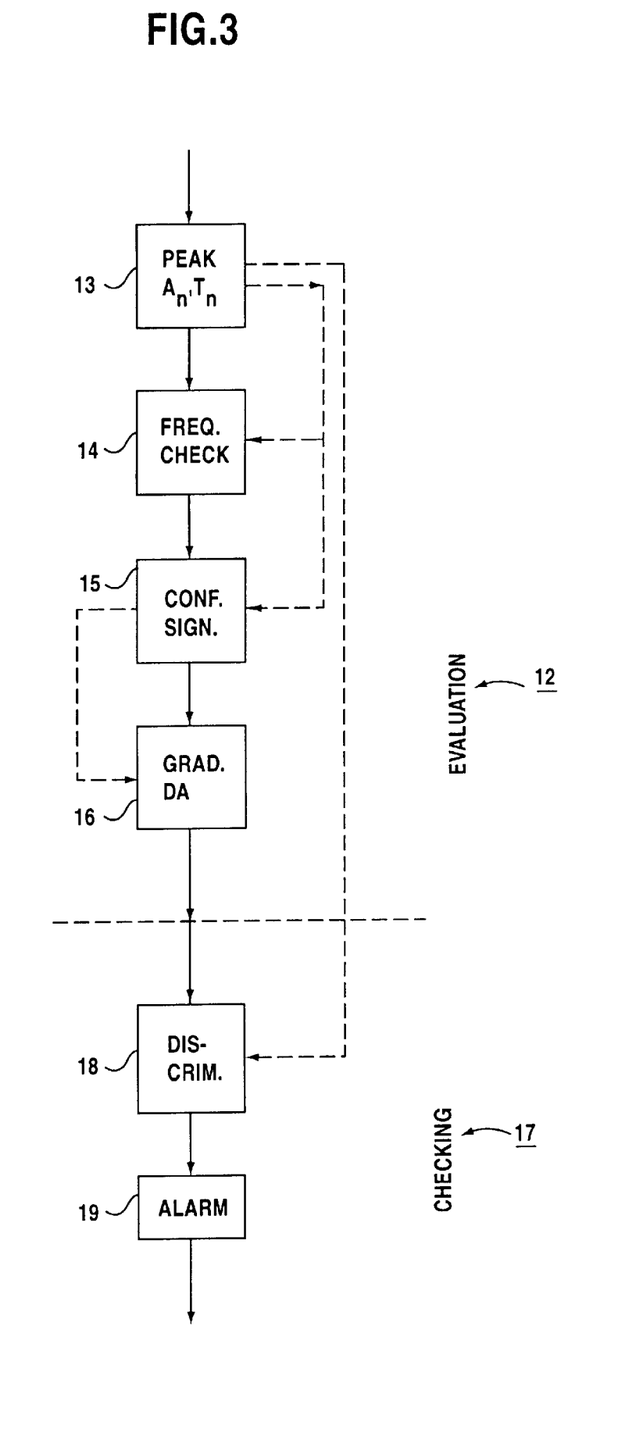
FIG. 3 is a schematic view of an evaluation unit and a monitoring unit in this region channel.

With reference to FIG. 3, the region channel of a system p contains an evaluation stage 12, in which firstly, in a first computing stage, the point in time $T_n$ is recorded at which an initially increasing signal value S, which lies above the noise limit $A_o$, has risen to an extreme value $A_n$ and drops once more (positive peak). As an alternative—or preferably in addition—a negative peak is also registered as the peak $A_n$ and its point in time $T_n$, that is to say an extreme value which lies beyond the noise limit $A_o$ which is formed by an initially falling and then rising (negative) value of the signal S. This extreme value registration 13 is followed by a further plausibility check 14 which, for example, is constructed similarly to the description in the Watford et al. patent, and checks whether the time interval $DT_n$, which can be registered in the extreme value monitoring 13, between the currently registered point in time $T_n$ and the previously registered point in time $T_{n-1}$ can correspond to an oscillation within the critical frequency band between 0.3 and 0.7 Hz. A further evaluation element 15 additionally checks whether the registered time interval $DT_n$ virtually coincides with the last-registered time interval $DT_{n-1}$. If this is not the case, then the registered peaks are not the amplitudes of an oscillation which is virtually undamped and could increase to hazardous extreme values; the further evaluation of the last-determined peak $A_n$ is then suppressed. If, on the other hand, these are values which can be assigned to the amplitude of an oscillating variable, then by means of a corresponding confirmation signal a subsequent computing element 16 is activated, which determines from the last-determined peaks their "rate of increase"

$$DA = \frac{|A_n| - |A_{n-1}|}{T_n - T_{n-1}}.$$

If, therefore, the respective signal value S can be described mathematically by a variable $S(t) \bullet \cos\Omega T$, then this rate of increase corresponds to the differential.

$$\frac{d}{dt} S(t).$$

In the case of evaluating positive and negative extreme values, for example, it indicates the growth of the extreme value in each case following a half-period $DT = T_n - T_{n-1}$ of the oscillation.

In the monitoring unit 17 ("checking"), a monitoring element 18 now forms a signal, in accordance with predetermined monitoring criteria which are described in more detail below, which signal indicates, for example as the binary signal in the state "0", that there is no hazardous oscillation corresponding to any of the monitoring criteria, whereas the state "1" of the corresponding monitoring signal sets off an alarm (item 19). This alarm signal, together with other information which, for example, identifies the region in which the monitoring criteria has responded, can be output to an display unit and/or stored in a memory for the purpose of documentation of the process.

Figure 4:
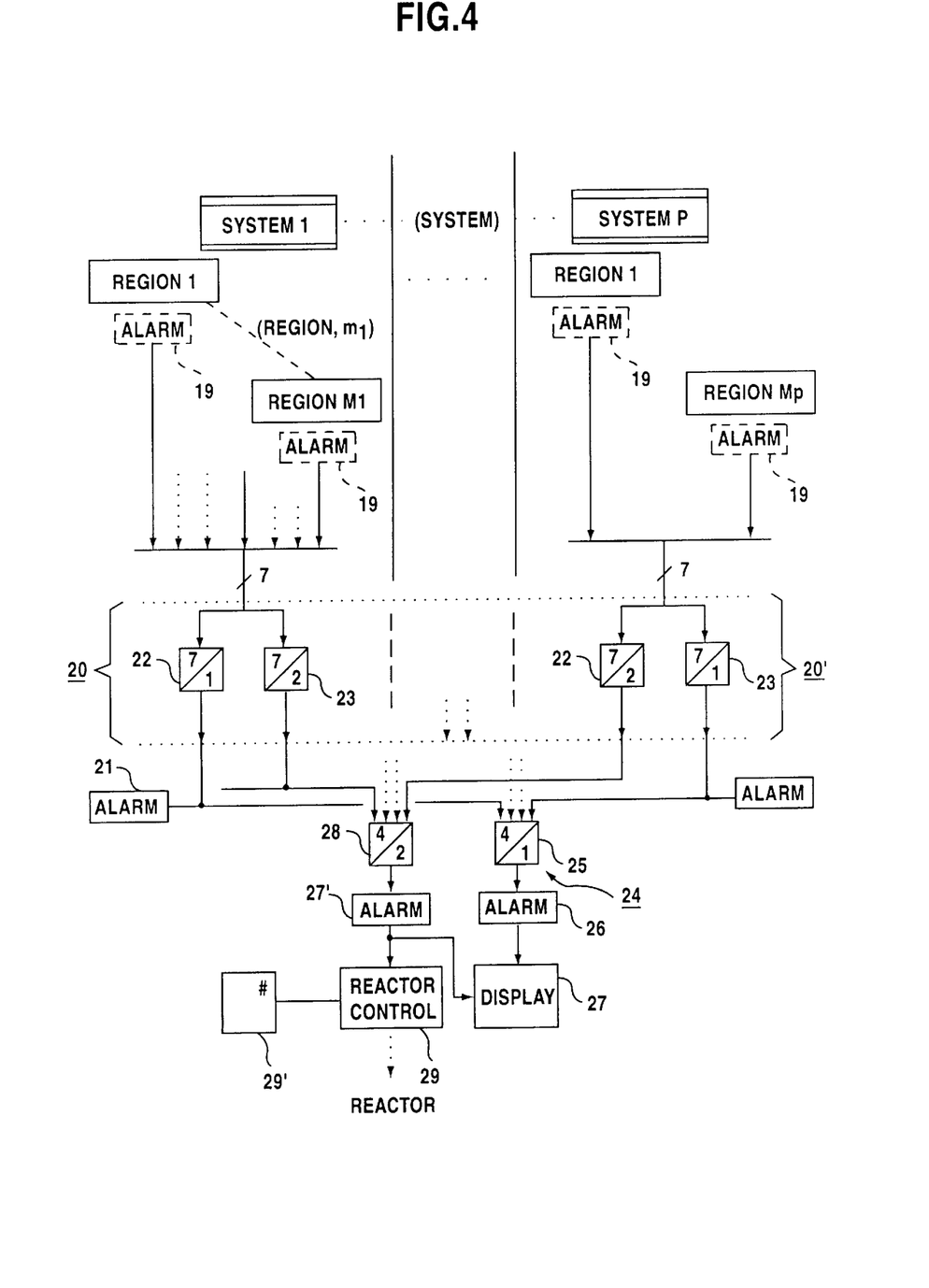
FIG. 4 is a schematic view showing the division of the region signals generated in various regions and region channels into systems, the region selection stages present in each system and the system selection stage for generating the alarm output signals.

This construction of the region channel m is advantageously provided in each region channel, as is indicated at the top left in FIG. 4 in the field "system 1" for each region of the total number M1 of regions of the system p=1, and in the right field "system P" for all the regions (total number $M_p$) of the system p=P.

The linear alarm region signals (for example also entered into the element 19) represent a $M_p$-multiple binary signal, corresponding to the number $M_p$ of the region channels, from which a $N_{mp}$—multiple binary signal is formed in a region selection stage 20, in order to indicate that a bit corresponding to an alarm has been set at least in a number $N_{mp}$ of the regions of this system.

In FIG. 4, the corresponding alarm region signals are combined once into a visual indication 21, where $N_m=1$ is selected. This means that the visual alarm 21 is triggered as soon as the bit corresponding to the alarm is set in at least one region channel. Each system therefore contains a selection element in which $N_{mp}=1$ is predetermined, i.e. a "1 out of 7" selection 22 (for example an OR element in digital evaluation) is executed, and the visual indication 21 is set, whereas if a second selection element 23 $N_{mp}=2$ is set, a "2 out of 7" selection takes place. To be precise, an appropriate alarm bit in the region signal is only set if the monitoring criterion is satisfied respectively in at least two regions of the system, in order to rule out a false alarm as a result of processing errors.

A system selection is now made in an output stage 24 which sets an alarm output signal if at least a minimum number $N_p$ from the total number P of the systems contains a set alarm signal. In this case, this system selection comprises a "1 out of 4" circuit 25 which is set to $N_p=1$ and outputs an alarm signal (item 26) which is visually indicated in a display 27 and indicates that a critical oscillation has been discovered in one of the systems. A "2 out of 4" selection 28, set to $N_p=2$, sets an alarm (item 27') which on the one hand can likewise be indicated in the display 27 and on the other hand acts on the reactor control 29 and there triggers a stabilization strategy which is stored in a memory 29' as an appropriate program.

In general, in each system the processing elements of the region channel which are illustrated in FIGS. 2 and 3 can be implemented by means of a central computer with its own power supply, a central processing unit, an input module for 32 analog input signals and an appropriate output module for 32 digital signals, the computer being utilized to about 50% given an operating frequency of 32 MHz with the parallel processing of the 28 sensor signals, which are contained in the 32-bit input of the computer. An advantageous sampling rate for the input signals is 50 Hz or more, but at least 20 Hz should be ensured. The usual processing elements for the sensor signals offer sufficient space for the processor units of the systems.

The output signals of these system processors can be connected to a commercially available microcomputer, in which the received region signals are processed and stored. This processor also contains the programs which are necessary to make the system selection and, in accordance with predefined strategies, to supply the signals which are necessary in the reactor control system for carrying out the respective stabilization measures. Optical fibers can advantageously be used as connecting lines.

The stabilization measures are explained with reference to FIG. 5, which does not take into account a scale corresponding to the actual relationships. A course of the relative region measured value S is assumed and from its values which lie above the noise limit $A_o$ the rate of increase DA is determined if the oscillation exceeds a threshold value or limit value $A_{lim}$. Here, the extreme case is assumed where, after a predefined maximum value $A_{max}$ of the amplitudes had been exceeded, a total SCRAM is initiated, a number N' (N'=2 here) oscillation periods being needed until it is sufficiently effective, whereas only a number N (for the purpose of illustration, N=3 is assumed here; in realistic conditions, N is very much larger) of oscillation periods has elapsed until the amplitudes of the relative measured value S pass through the region between $A_{lim}$ and $A_{max}$.

Figure 5:
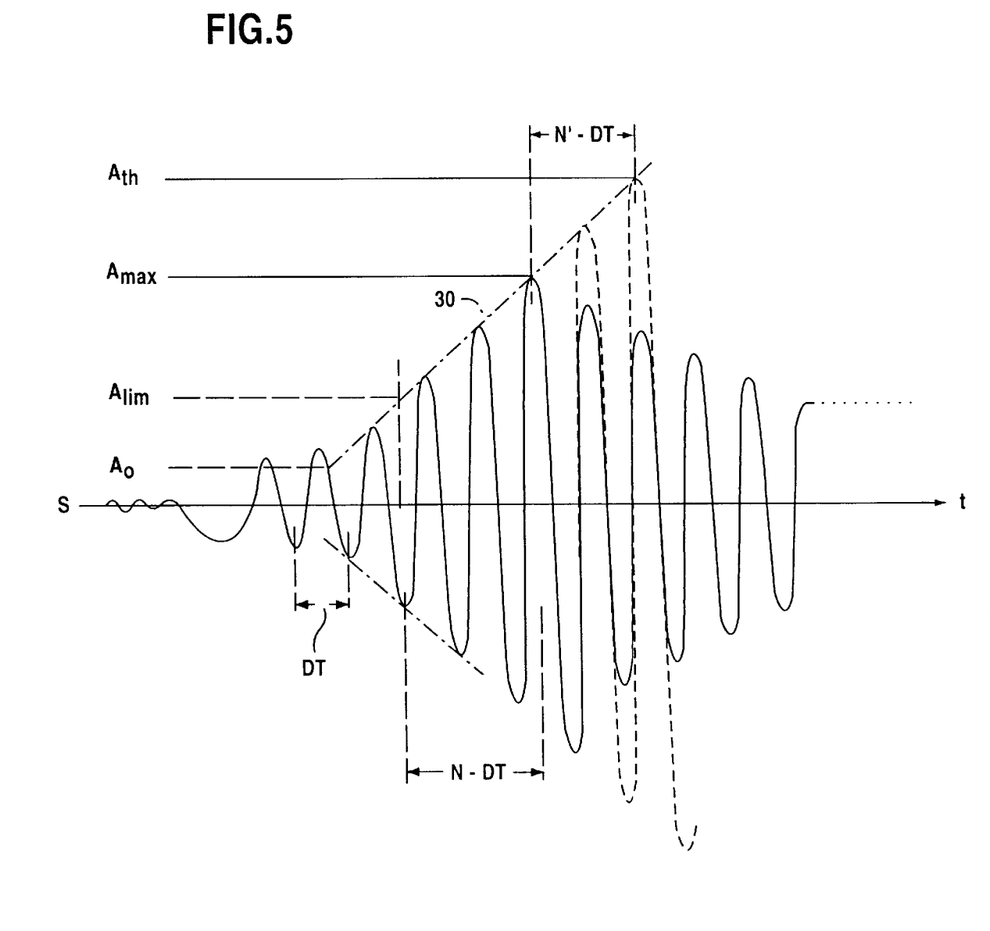
FIG. 5 is a graph illustrating a critical oscillation in the measured value of the flux and its damping in the case of a SCRAM.
Figure 6:
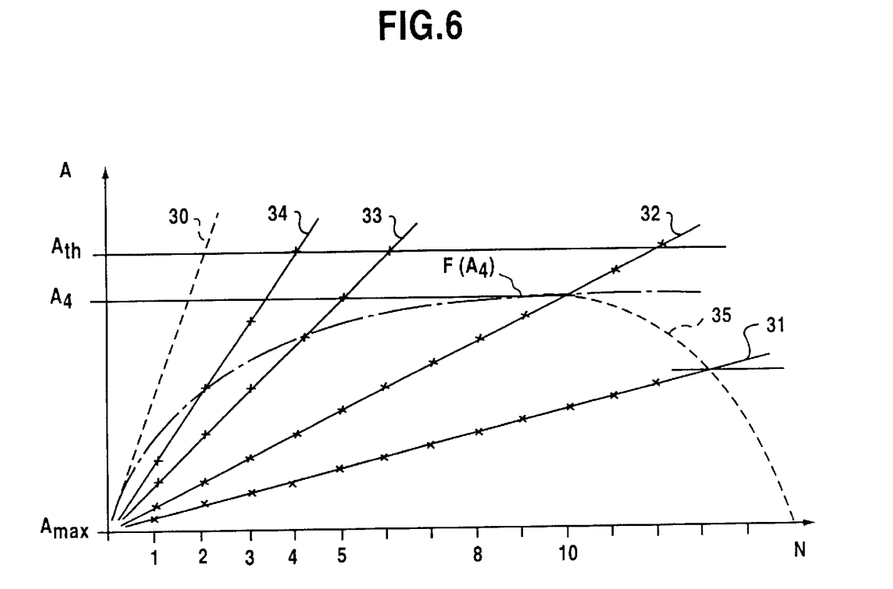
FIG. 6 is a graph showing the amplitude values of the flux, in each case increasing in an undamped manner at a different rate of increase, until the thermal-hydraulic threshold value $A_{th}$ is reached.

A curve 30 in FIG. 6 corresponds to the extreme case represented in FIG. 5 by the slope 30 (half envelope), further curves 34, 33, 32 and 31 being specified in FIG. 6 whose rate of increase DA is respectively lower by the factor ½, ⅓, ¼ and ⅕. It can be seen from FIG. 6 that in the case of these rates of increase a SCRAM, which would be triggered when the threshold value $A_{max}$ were exceeded, is not yet necessary; instead the time or number N' of oscillation periods DT which is or are necessary for the effectiveness of the SCRAM permits the reactor to continue operating at power for a certain number N of periods. The number N can be seen from the point of intersection of the curves 32, 33. with the curve $F(A_4)$. For oscillations whose amplitudes grow still more weakly than the curve 32 when the threshold value $A_{lim}$ is exceeded, it can be assumed that such weakly increasing transient transitions inherently decay, so that it is provisionally not necessary to intervene in the reactor operation for a number N of operating periods, this number resulting from the point of intersection of the corresponding curves with the limit curve 35. An upper threshold value A4 in this case ensures that it is still possible, even in the case of an unchangingly growing amplitude, for a SCRAM to be initiated, the number N'=2 of oscillation periods still being available for its effectiveness.

In FIG. 5, the relationship which is given by the curve $F(A_4)$ between the rates of increase DA and the periods N which are still available before the initiation of a SCRAM, following the exceeding of the threshold value $A_{max}$ are reproduced as a corresponding limit curve F(DA). A curve of this type—taking into account a sufficient safety margin—can be determined from model calculations for the behavior of the reactor under transient conditions and also from the comparison of such model calculations with actually observed reactor states and, for example, can be stored as a characteristic curve in a memory. It is then sufficient, when the threshold value $A_{lim}$ is exceeded, to make use of the respectively detected rate of increase in order to take the appropriate value N (that is to say the values $N_1, N_2, N_3, N_4$ for the curves 31, 32, 33, 34). When the amplitude value of $A_{max}$ is exceeded, a counter can be set to the appropriate value N, and counted down with each confirmation signal (FIG. 3). The reactor operation then does not need to be interrupted by a total SCRAM, provided the counter reading has not been counted down to zero. Here too, the total SCRAM only needs to be initiated when the amplitude threshold value $A_4$ has been reached. As a rule, however, the oscillation has already inherently been damped within this time and decays once more, which can in particular be ensured by an alarm signal being set when the threshold value $A_{max}$, is exceeded, in this alarm stage that alarm signal prevents only changes in the operating state being undertaken in the control system which could lead to an increase in power and hence to a further transient excitation of the oscillation. In this case, therefore, only if the threshold value $A_{max}$ is exceeded is a stabilization strategy simply followed which corresponds to a low-ranking alarm stage and does not require any interruption in the reactor operation, in particular no SCRAM, as long as a highest-ranking alarm stage with a total SCRAM is not present as a result of exceeding the curve given in FIG. 7 and/or exceeding the threshold value $A_4$.

Figure 7:
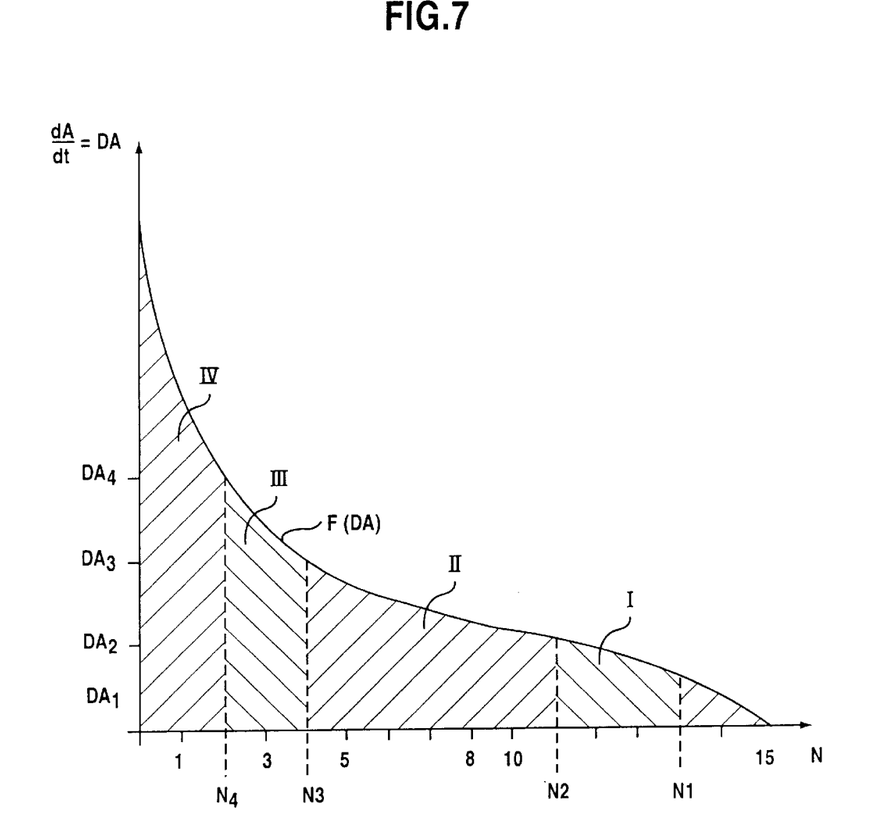
FIG. 7 is a plot of the relationship between the rate of increase DA and the oscillation periods which are available until a permissible maximum value $A_{max}$ is reached.

However, it is also possible to dispense with a characteristic curve which, for each value DA, determines the corresponding time which is still available before a SCRAM (number of periods N), and instead to monitor the rate of increase DA by means of appropriate threshold value detectors for the exceeding of specific threshold values, as specified in FIG. 7 by $DA_1$, $DA_2$, $DA_3$ and $DA_4$. If, therefore, there is for example a rate of increase which lies below the threshold value $DA_1$, it is then possible to wait for a corresponding number of periods N, in which no safety measures at all are yet necessary, that is to say no stabilization strategy with a special intervention in the reactor control is necessary.

In the region between the threshold values $DA_1$ and $DA_2$ (alarm stage I), provision can, for example, be made for the reactor operation to be allowed to continue for a number $N_2$ of oscillation periods, in which case it may be advantageous to prevent the reactor from being raised to increased power. In the alarm stage II, the duration for this reactor operation can be limited to a number $N_3$ of reactor periods. It is also possible, in order to improve the damping, to provide for some of the control rods to be moved slowly into the reactor, which corresponds to a reduction in the reactor power, as is provided operationally when a lower power is demanded of the reactor. The threshold values $DA_3$ and $DA_4$ for the rate of increase determine an alarm stage III, in which the reactor can still run further for a number $N_4$ of periods. It is also possible in this case to move some of the absorber rods in rapidly, which is referred to as a "partial SCRAM". Only when the threshold value $DA_4$ is exceeded does a total SCRAM appear necessary in a highest-ranking alarm stage.

Figure 8:
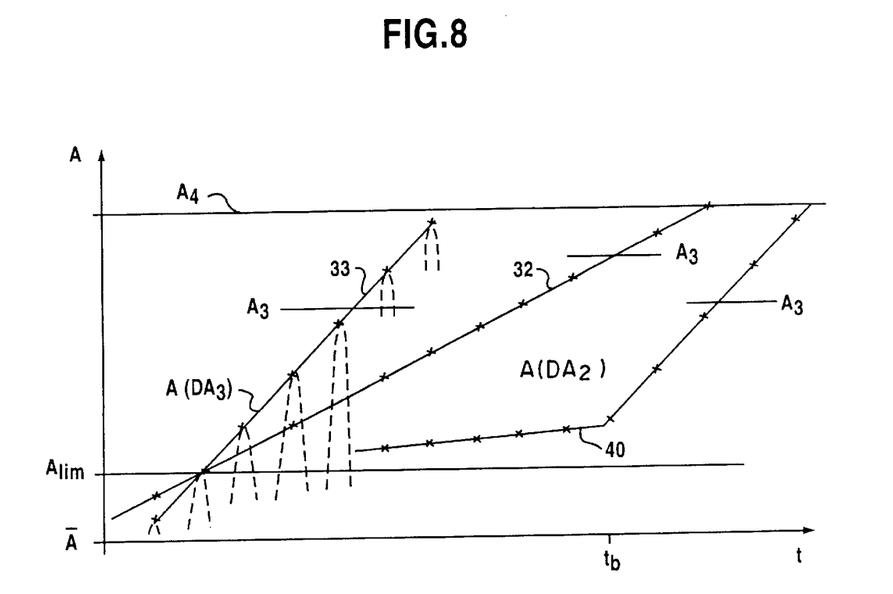
FIG. 8 is a graph showing the amplitudes occurring at different rates of increase in the event of an oscillation which is inadequately damped by a stabilization strategy.

A further variant of the invention is explained with reference to FIGS. 8 to 10. Rates of increase are shown in FIG. 8, in this case for the amplitudes of the relative region signal S, which correspond to the curves 32 and 33 of FIG. 6. These amplitudes are determined at the point in time at which they exceed the threshold value $A_{lim}$. It is assumed that the alarm stage II has been detected by the monitoring stage and a stabilization strategy has been initiated in which the reactor power is to be stabilized by moving the control rods in slowly. In the envelope 33, the amplitudes which occur under these conditions are indicated by continuous lines. The stabilization strategy corresponding to alarm stage II—if it were maintained at amplitude values which lie above a threshold value indicated by $A_3$ and illustrated by peaks which are drawn with dashed lines—would lead to a total SCRAM having to be initiated with the threshold value $A_4$. However, a total SCRAM of this type should be avoided. Therefore, when the threshold value $A_3$ is reached, a transition is made from the stabilization strategy discussed in conjunction with the alarm stage II in FIG. 7 (slow insertion of absorber elements) to a higher alarm stage with a higher-ranking stabilization strategy, namely the above-mentioned partial SCRAM. As a result, the oscillation is now damped more heavily, with the result that the amplitudes no longer increase and the threshold value $A_4$ is not reached and, in turn, the total SCRAM is not initiated.

The curve 32 shows that the threshold value $A_3$ can also be set higher in this case, given a lower rate of increase, than in the case of a higher rate of increase.

In this embodiment, therefore, it is not the rate of increase which is monitored for the exceeding of threshold values. Instead, the instantaneous detected rate of increase is used to predefine a threshold value for the amplitude values themselves. The dependency of the threshold value on the rate of increase can by contrast in turn be determined in accordance with a calibration curve, similar to FIG. 7, or the threshold value $A_3$ can also be changed in discrete steps by means of an appropriate division of the region available for the rate of increase into individual alarm stages.

This embodiment provides the advantage that changes in the decay rate of the oscillation, which occur during reactor operation even after the threshold value $A_{lim}$ has been exceeded, are taken into particular account. This is shown by the curve 40 in FIG. 8, in which it is initially assumed that the oscillation grows so weakly as it exceeds the threshold value $A_{lim}$ that an intervention in the reactor control system is not necessary. However, it is assumed that the operating personnel have performed an increase in the power at time $t_b$ via the operational reactor control system. As a result, the transiently excited oscillation is considerably amplified. This leads to the situation where the amplitude A, whose rise was initially low when it crossed over $A_{lim}$ and which has not triggered any alarm, now assume the value of curve 33, so that the amplitude A is now monitored with regard to its exceeding the threshold value $A_3$. Also, the stabilization strategy ("partial SCRAM") which is proper in the alarm stage III is initiated. This results in the increasing oscillation being damped more heavily, so that even in this case the threshold value $A_4$ is in practice no longer reached. The result, of course, is that a total SCRAM has been averted.

In a similar manner to the threshold value $A_3$ for the amplitude A, which leads to the initiation of the partial SCRAM, it is of course also possible for an appropriate threshold value $A_1$ and $A_2$ to be introduced for the lower-ranking stabilization strategies (blocking of an increase in power, alarm stage I; or slow introduction of additional absorber elements, alarm stage II).

Figure 9:
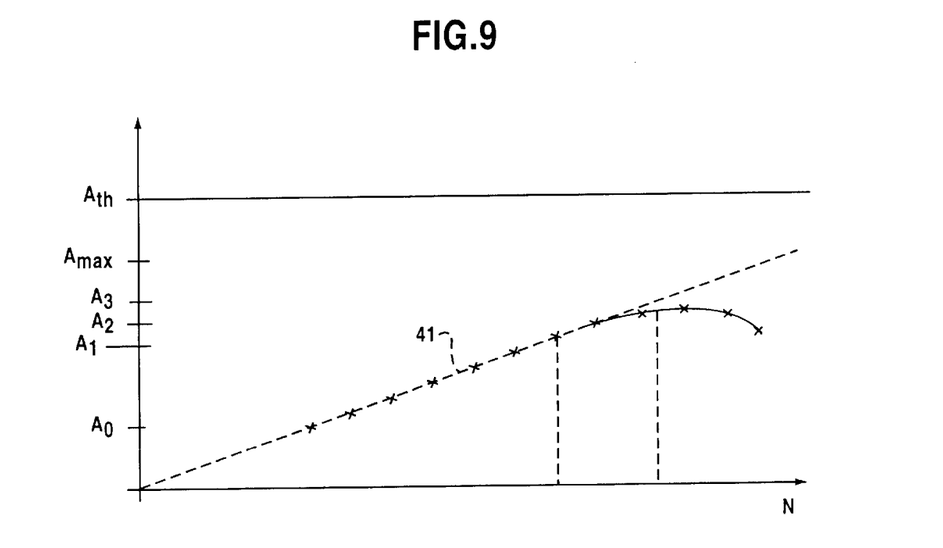
FIG. 9 is a graph showing the course of the extreme values (amplitudes) in the case of operating the reactor with a relatively weakly decaying oscillation according to a preferred embodiment of the invention.

This is shown in FIG. 9 using an oscillation whose envelope increases at a relatively low rate. In this case the extreme values (amplitudes) of the oscillation lie on an envelope curve 41 and are monitored for exceeding the threshold values $A_1$, $A_2$, $A_3$ which, in accordance with the high number N of oscillation periods which are available in the case of this rate of increase, lie relatively close to the threshold values $A_{th}$ and $A_{max}$. When the threshold value $A_1$ is exceeded, the first alarm stage is set, whose stabilization strategy provides only for the blocking of an increase in power. As a result, although the rate of increase is lowered, the oscillation is not yet sufficiently damped. When the threshold value $A_2$ is exceeded, however, the power of the reactor is lowered and the oscillation is damped in such a way that further growth to the threshold values $A_3$, $A_{max}$, $A_{th}$ already no longer occurs.

Figure 10:
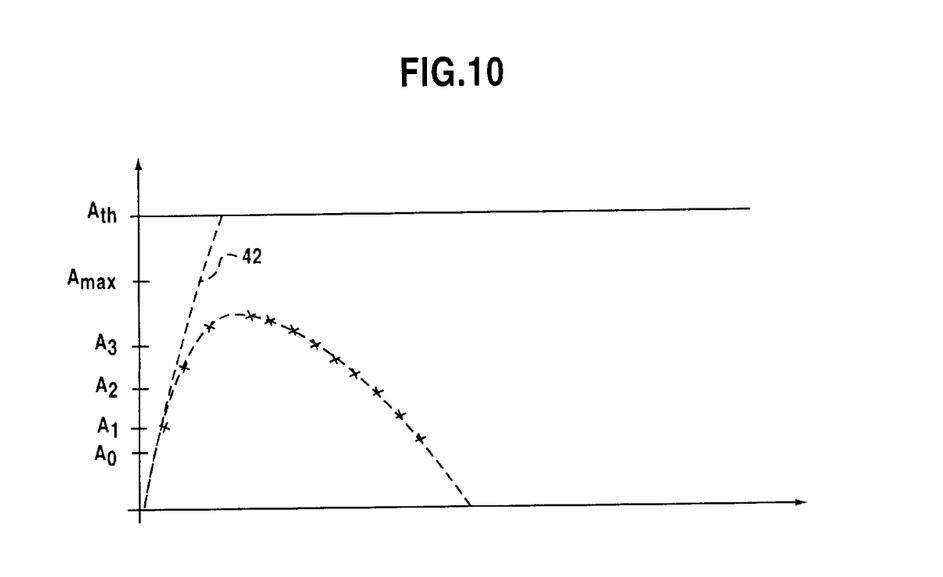
FIG. 10 is a similar view illustrating the case of a rapidly increasing oscillation.

The curve 42 shown in FIG. 10 is based on a relatively high rate of increase DA, for which reason the threshold values $A_1$, $A_2$ and $A_3$ are set lower in this case—depending on the detected rate of increase DA—than in FIG. 9. Hence, the alarm stage II (threshold value $A_2$) is already reached relatively early, and the "partial SCRAM" provided in the alarm stage III as a result of exceeding the threshold value $A_3$ is also performed earlier. This leads to the desired damping of the oscillation and prevents the threshold value $A_{max}$ from being exceeded. By this means, total shutdown is prevented even in this unfavorable case.

The resetting of the respective alarm stages can be performed, for example, when the amplitude once more falls below the threshold value $A_{lim}$.

Figure 11:
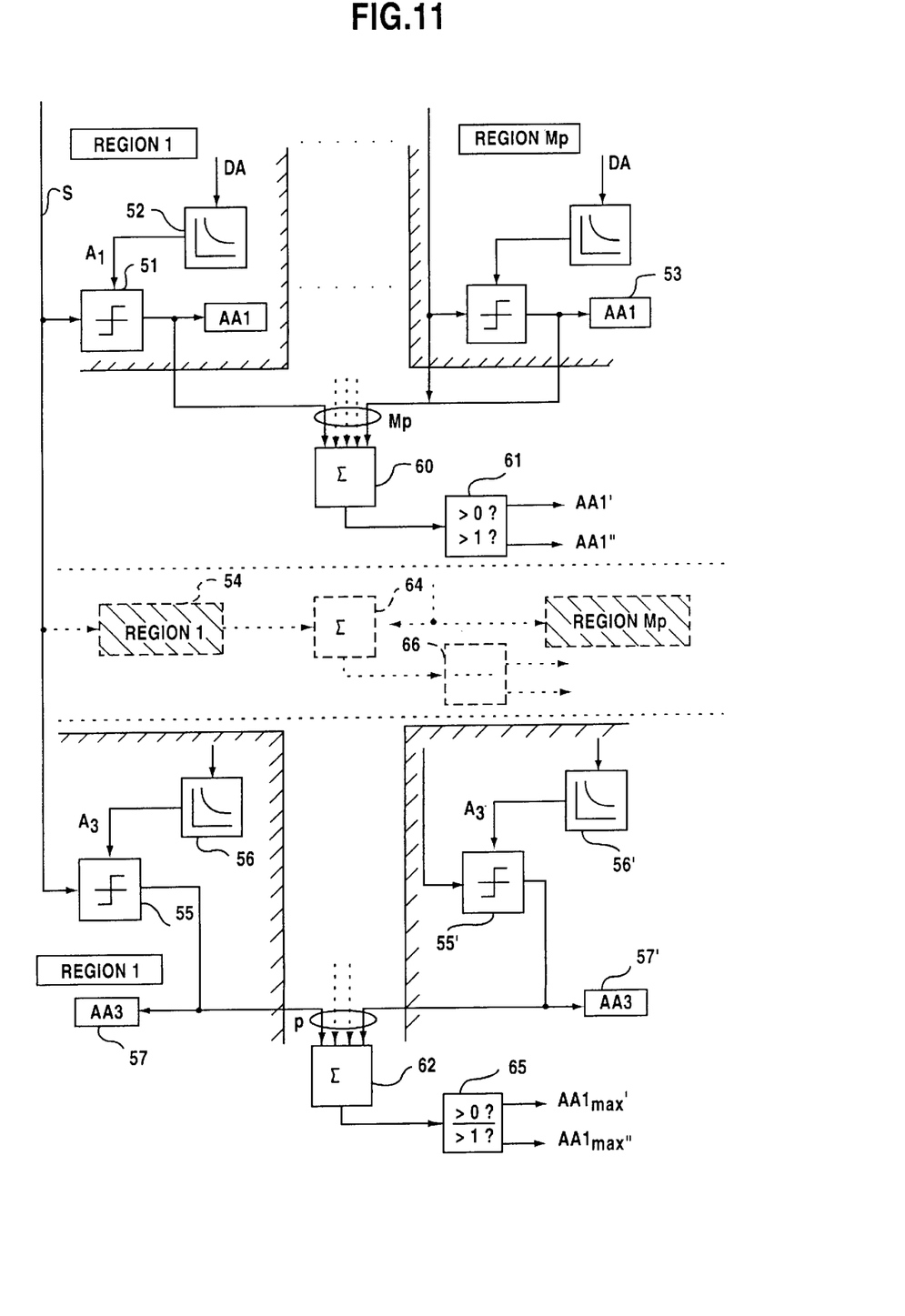
FIG. 11 is a schematic of a region monitoring stage in a preferred exemplary embodiment.

FIG. 11 illustrates an embodiment for the monitoring in the command channels of the system 1, the region selection stage for the alarm signals, which are set in the region signal by means of this monitoring, and the monitoring device in the corresponding system channel.

In this case, the region monitoring in the first region of the channel 1 is illustrated in the fields in each case designated by "region 1", the region signal assigned to this first region and corresponding to the threshold value $A_1$ being fed to a threshold value detector which sets a logic alarm signal "1" if the region signal S exceeds the threshold value $A_1$.

The threshold value is taken from a memory 52 for a characteristic curve. In accordance with the stored characteristic curve, this threshold value $A_1$ corresponds to the value DA of the current rate of increase determined in the region channel 1 (component 16, FIG. 3). Using the logic output signal of the threshold value detector 51, on the one hand an indicator and/or memory unit 53 can be driven, which now forms an alarm region signal AA1, which is assigned to the first alarm stage, for the monitoring signal AA1, which is assigned to the first alarm stage and to the first region channel. In a similar way, the relative region signal S is performed in an evaluation unit 54 (not shown in more detail) with respect to the threshold value A2, and in a monitoring stage containing the threshold value detector 55, the characteristic curve memory 56 and the indicating and/or memory unit 57, with respect to the threshold value $A_3$ and the alarm stage III. What is not shown is that the signal S can be monitored for the exceeding of a fixedly predefined threshold value $A_4$ by means of a further threshold value detector.

The corresponding elements are present in each region signal of the system and are also indicated for the last region "region $M_p$" in the right-hand part of FIG. 11, using the reference symbols 51', 52'. . . 57'.

The monitoring signals which are formed by the threshold value detectors 51, 51' in the individual region channels (i.e., a 7-bit signal in the case of $M_p$=7) can be summed in a summing element 60. This signal thus indicates in how many region channels the corresponding threshold value detector 51 has set an alarm signal of stage I. If this number is greater than or equal to a predefined number $N_{mp}$, then an appropriate interrogation unit 61 sets a corresponding alarm system signal. In this case, the interrogation unit 61 performs this interrogation twice, the minimum number $N_{mp}$ being set to 1 for a first alarm system signal AA1'. This signal AA1' can then be used to indicate, via a corresponding system selection (in the simplest case a summing element— not shown—for all the signals AA1' from all the redundantly operating system channels), whether and how many systems are generating the alarm stage I.

In addition, in this system monitoring 61, $N_{mp}$=2 is also set. A corresponding signal AA$_1$" is output if at least two regions report the alarm of stage I. This signal can be used in the system selection to form an alarm output signal from all the alarm signals which are generated in the redundantly operating systems. The alarm output signal can intervene in the control system of the reactor and there block an operational increase in the reactor power. In the simplest case it is sufficient if the system selection forms only a "1 out of 4" selection, i.e., it combines the appropriate signals AA1" of the four systems by means of an "OR" element. However, in order to reliably avoid unnecessary disturbances to the reactor operation, which could be produced by faulty processing in one of the systems, a minimum number $N_p$ for the system signals, in which the alarm stage I is set, is advantageously predefined for the intervention in the reactor operation. This can be carried out in a simple way in that the logic signals AA1" of the systems are added and produce the intervention in the reactor control system only if the sum is greater than or equal to 2.

In a similar way, the monitoring signals assigned to the alarm stages II and III of the individual regions of the system can be processed via the summing elements 62, 64 into corresponding signals which, in the interrogation units 65, 66 for generating the alarm system signals assigned to these stages, supply AA3' and AA3". The [lacuna] from the alarm signals AA2" of the four system signals are further processed (not illustrated) in the same way as was described with reference to the signals AA1", and form an alarm output signal assigned to this alarm stage II, which signal intervenes in the reactor operation in such a way that not only is an increase in the reactor power blocked but the reactor power is even reduced in accordance with the programs which are provided for normal reactor operation.

In the same way as was described with regard to the signals AA1" of the first alarm stage, the alarm signals AA3" assigned to the alarm stage III are also further processed and form an alarm output signal assigned to this alarm stage III. The signal triggers a "partial SCRAM" in accordance with the stabilization strategy assigned to this alarm stage.

Finally, it should be noted that the alarm signals formed by means of the fixedly set threshold value $A_4$ are further processed in the same way, so that, in an emergency, a total SCRAM is triggered corresponding to the highest alarm stage.

The invention therefore ensures on the one hand that the unstable state of the reactor is monitored with a sufficient redundancy in order to be able to make a reliable statement about the unstable state, given failure of individual sensors, measuring lances or computing elements; on the other hand the invention allows a minimum in intervention in the reactor operation in order to damp the instability. In this case, a total SCRAM is virtually ruled out in accordance with all experience and estimations, so that the fourth alarm stage—a total SCRAM—can be viewed as completely superfluous. The constructional elements provided for monitoring the threshold value $A_{max}$ and the transmission elements for an alarm signal assigned to this highest alarm stage are therefore described only as an option which may also be dispensed with.

We claim:

1. In a boiling-water reactor with a reactor core, a method of monitoring the reactor core for an unstable state caused by a local oscillation of a physical variable, the method which comprises:

a) disposing a plurality of sensors each in a plurality of regions of a reactor core and measuring with the sensors a physical variable which is subject to local oscillations; combining output signals of the sensors into a given number of region channels and assigning to each region channel a region and the sensors disposed in the region for generating a region signal;

b) combining the region channels into a given number of system channels and generating a system signal; and c) assigning the system signals to an output channel and generating an output signal in the output channel;

d) setting, with monitoring stages and selection stages, an alarm output signal in each output channel if a monitoring criterion is satisfied in at least a predefined number of the system channels over a plurality of oscillation periods in a minimum number Nmp of the respective system channel;

e) connecting the sensors such that an output signal of each sensor influences only a single region signal, and each region signal influences only a single system signal; and f) forming the region signals of each system channel from the output signals of those sensors which are located in regions distributed over a cross section of the reactor core in such a way that the regions which are respectively adjacent to such a region contain sensors, the output signals of which are assigned to region channels of other system channels.

2. In a boiling-water reactor having a reactor core, a device for monitoring the reactor core with respect to local oscillations of a physical variable causing an unstable state of the reactor, which comprises:

a system selection stage, a plurality of region selection stages connected to said system selection stage, a given number of region monitoring stages connected to each said region selection stage, and a sensor stage connected to each said region monitoring stage with a plurality of sensors strategically disposed in regions of a reactor core of a boiling water reactor, wherein a) measured signals supplied by said sensors to a respective said region monitoring stage are combined into a region signal for the physical variable; each said region signal is monitored in the respective said region monitoring stage in accordance with a monitoring criterion, and a region signal containing a region monitoring signal is output by each region monitoring stage;

b) each region signal is connected to at least one of said region selection stages, and said region selection stages forming respective system monitoring signals from a predefined minimum number of region monitoring signals; and c) said region selections stages each outputting a respective system monitoring signal to said system selection stage, and said system selection stage outputting an output monitoring signal according to a predefined minimum number of systems.

* * * * *